(12) United States Patent
Nakazawa et al.

(10) Patent No.: US 7,775,812 B2
(45) Date of Patent: Aug. 17, 2010

(54) CONNECTION DEVICE TO WHICH ELECTRIC DEVICE IS CONNECTED AND HAVING DUST-PROOF FUNCTION

(75) Inventors: Yukihiro Nakazawa, Kanagawa (JP); Tetsuo Ito, Kanagawa (JP); Tomio Takegawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 73 days.

(21) Appl. No.: 12/373,579

(22) PCT Filed: Feb. 1, 2008

(86) PCT No.: PCT/JP2008/051667

§ 371 (c)(1),
(2), (4) Date: Jan. 13, 2009

(87) PCT Pub. No.: WO2008/108126

PCT Pub. Date: Sep. 12, 2008

(65) Prior Publication Data

US 2009/0291602 A1    Nov. 26, 2009

(30) Foreign Application Priority Data

Mar. 1, 2007  (JP) .............................. 2007-051111

(51) Int. Cl.
*H01R 13/60* (2006.01)
(52) U.S. Cl. ..................................... 439/137
(58) Field of Classification Search .................. 439/350, 439/137, 138, 139, 143, 147
See application file for complete search history.

(56) References Cited

U.S. PATENT DOCUMENTS 4,707,042 A * 11/1987  Haden .......................... 439/140
5,695,350 A * 12/1997  Mei ............................. 439/139
5,746,612 A *  5/1998  Chien-Yuan ................. 439/139
6,555,771 B2 *  4/2003  Shao ......................... 200/51 R

FOREIGN PATENT DOCUMENTS

| GB | 2127235 | * | 4/1984 |
| GB | 2149978 | * | 10/1984 |
| JP | 2003-157909 A | | 5/2003 |
| JP | 2004-147360 A | | 5/2004 |
| JP | 2004-215330 A | | 7/2004 |

OTHER PUBLICATIONS

International Search Report for PCT/JP2008/051667.

* cited by examiner

*Primary Examiner*—T C Patel
*Assistant Examiner*—Phuong Nguyen
(74) *Attorney, Agent, or Firm*—Pearne & Gordon LLP

(57) ABSTRACT

The convenience of operation is improved and the occurrence of connection failure between a connection-target terminal of an electric appliance and a connection terminal is reduced without requiring a complicated arrangement such as a fitting structure. A microphone charging device has a dustproof shutter provided so as to be movable with a microphone device setting/drawing-off operation between a covering position covering a charging terminal portion and an exposure position exposing the charging terminal portion, a torsion spring applies a fundamental urging force to the shutter between the covering position and exposure position, and plate springs apply additional urging force to the shutter in addition to the fundamental urging force in an additional urging section provided between the covering position and exposure position and thereby sets the shutter in an additionally urged state. When the shutter reaches the exposure position, the plate springs release the shutter from the additionally urged state.

2 Claims, 14 Drawing Sheets

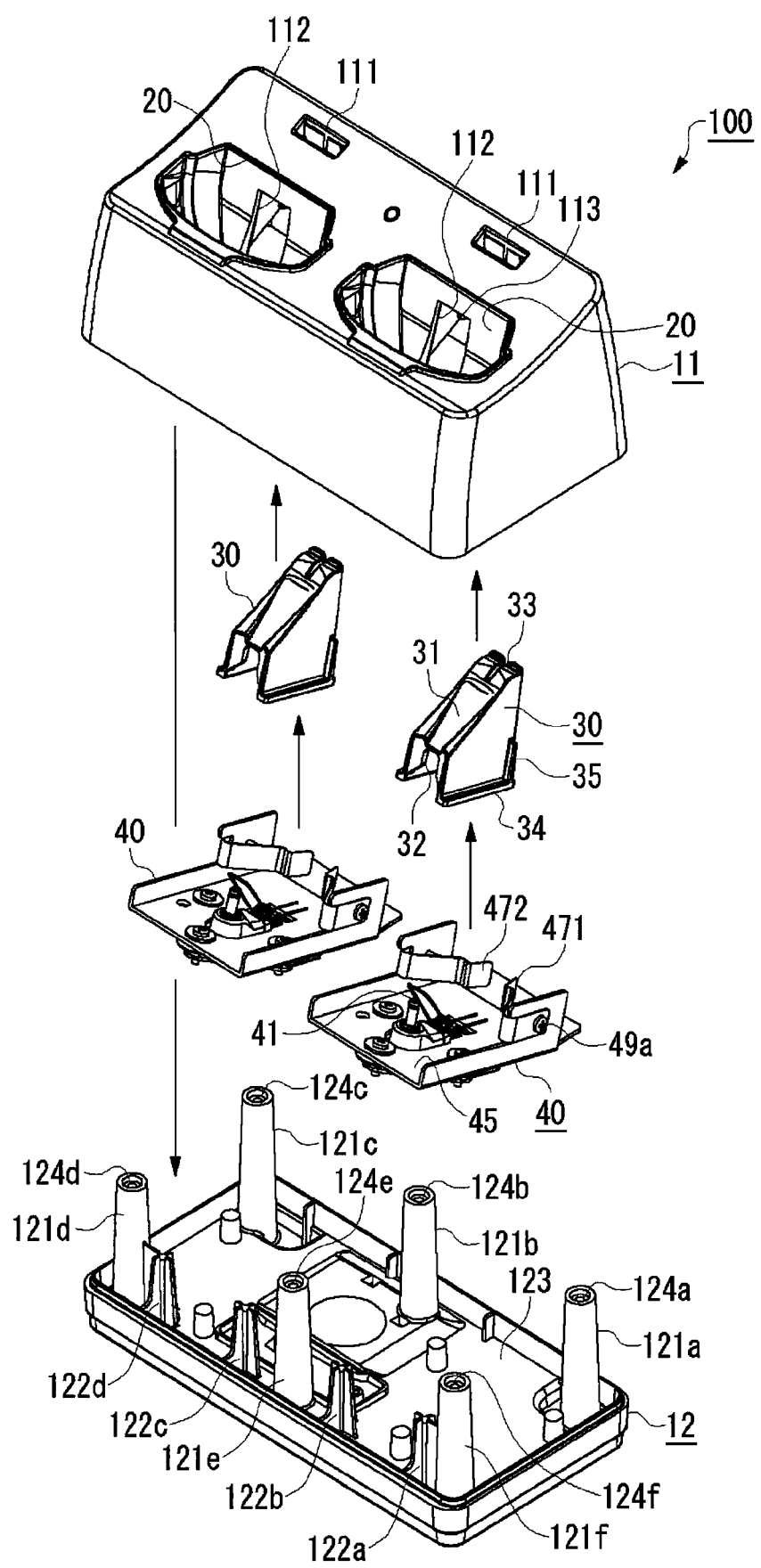
[FIG.1]

[FIG.2]
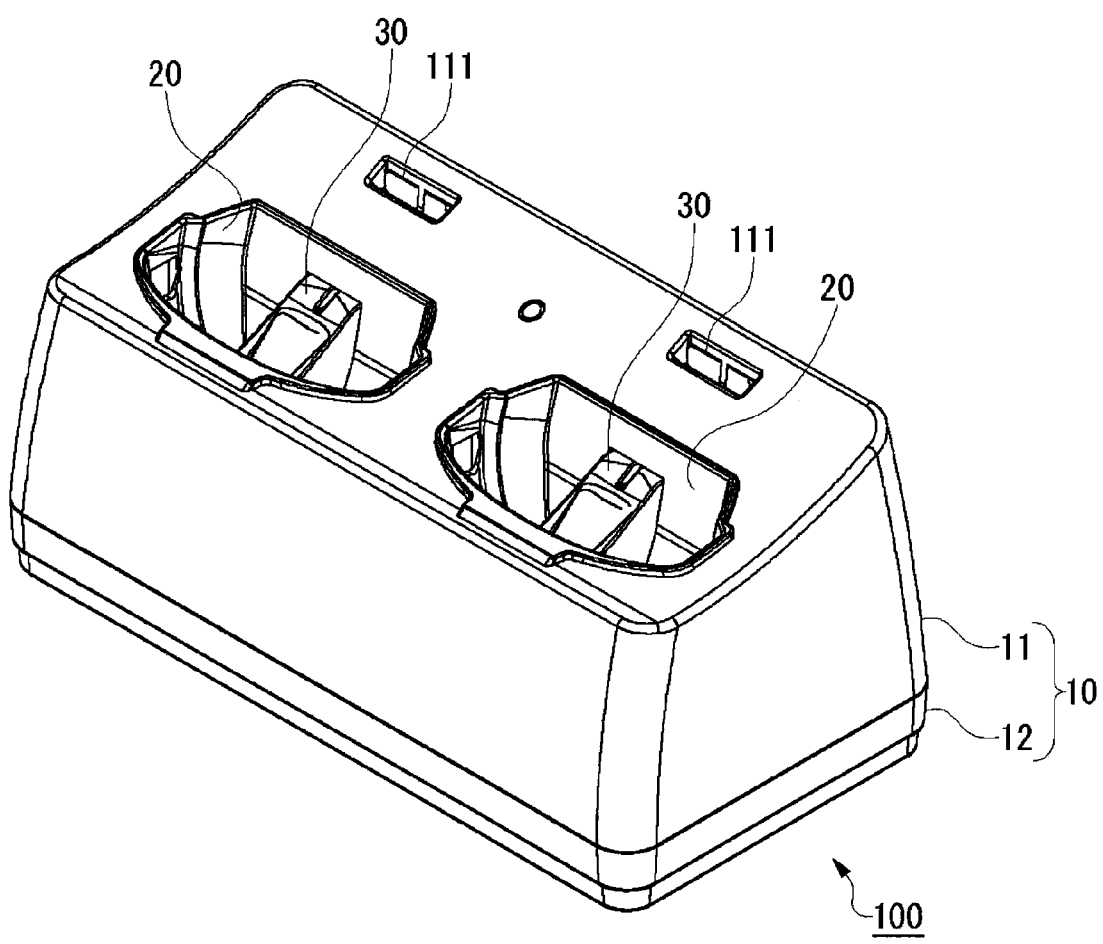

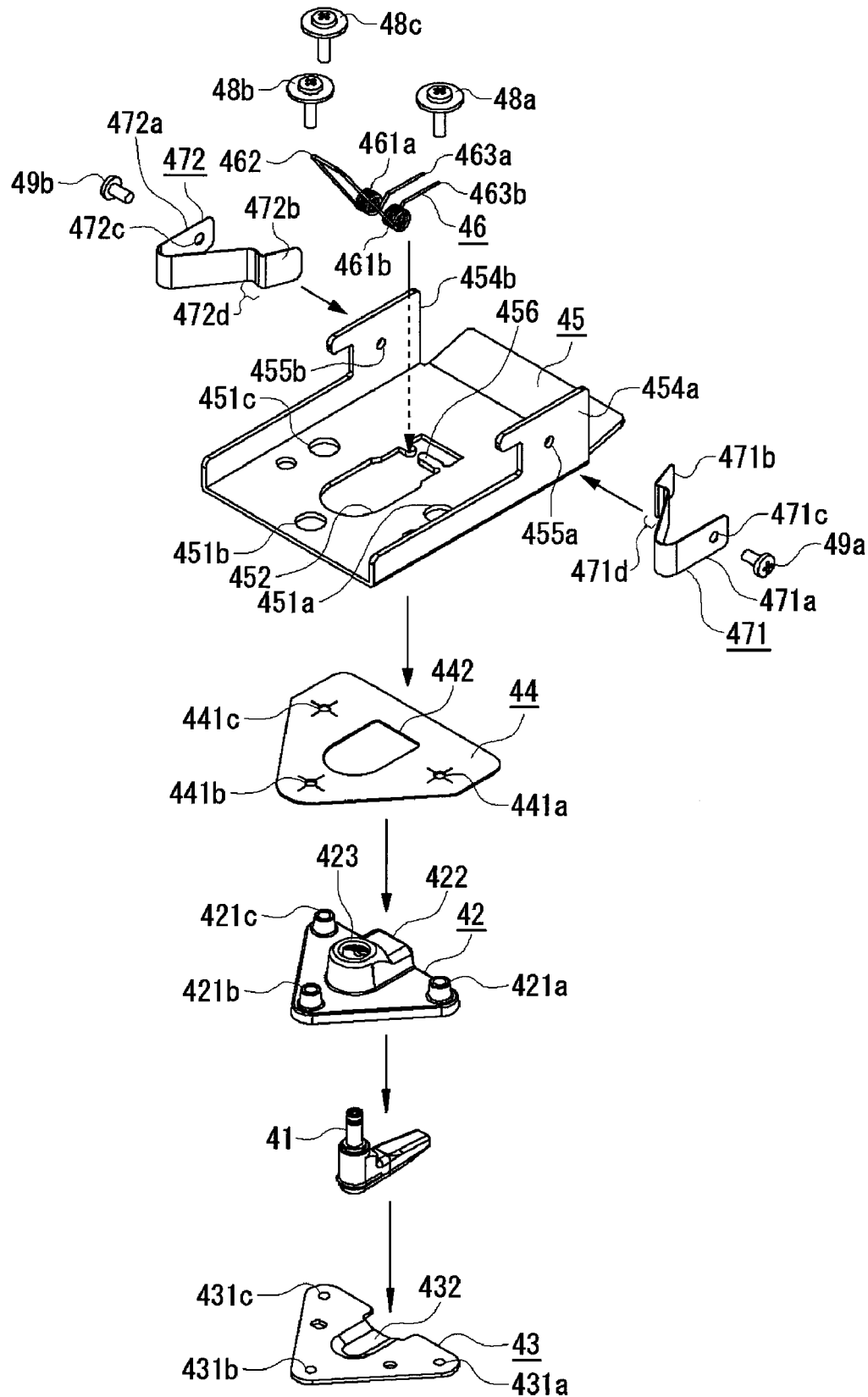
[FIG.3]

【FIG.4A】
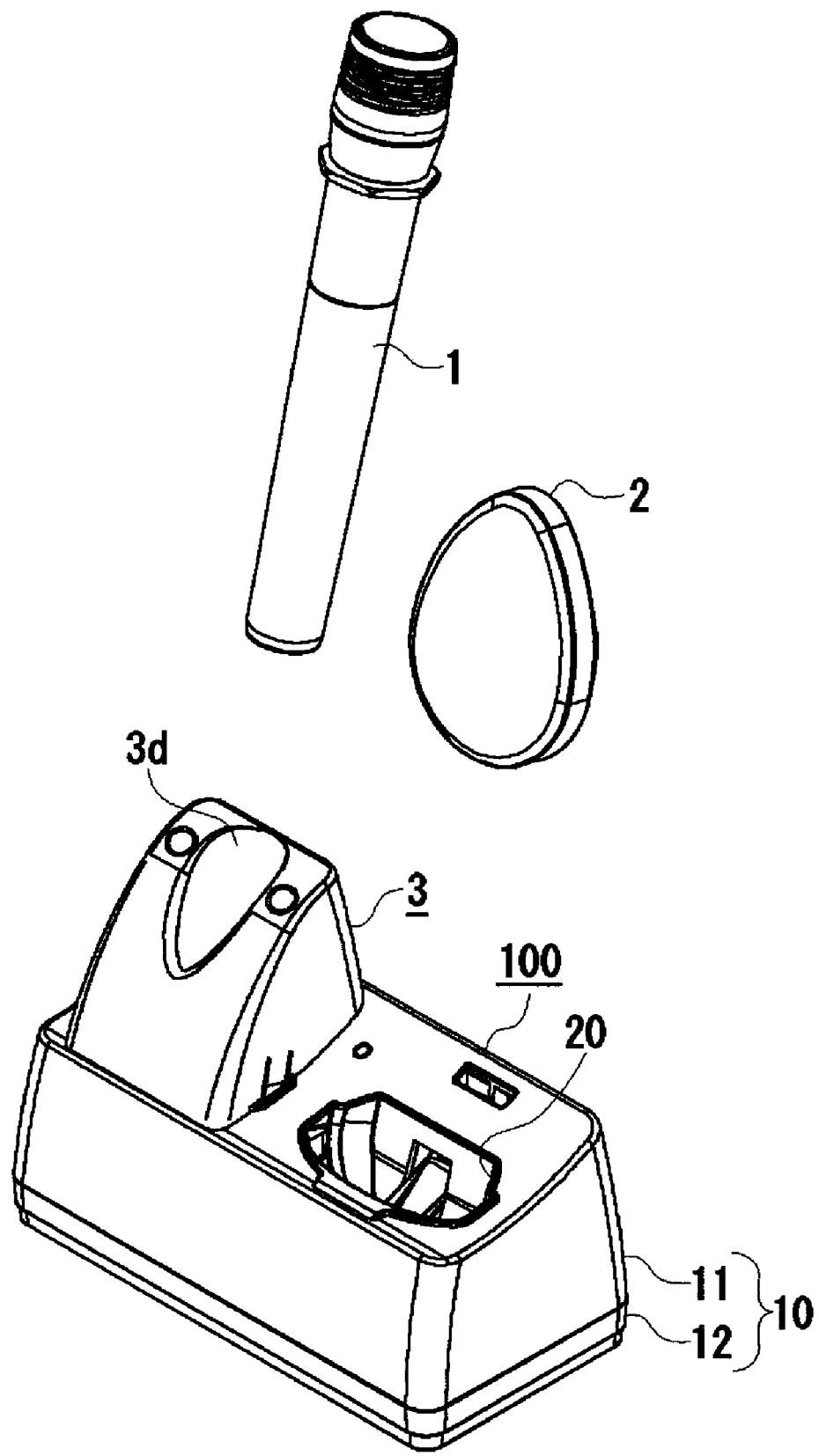

【FIG.4B】
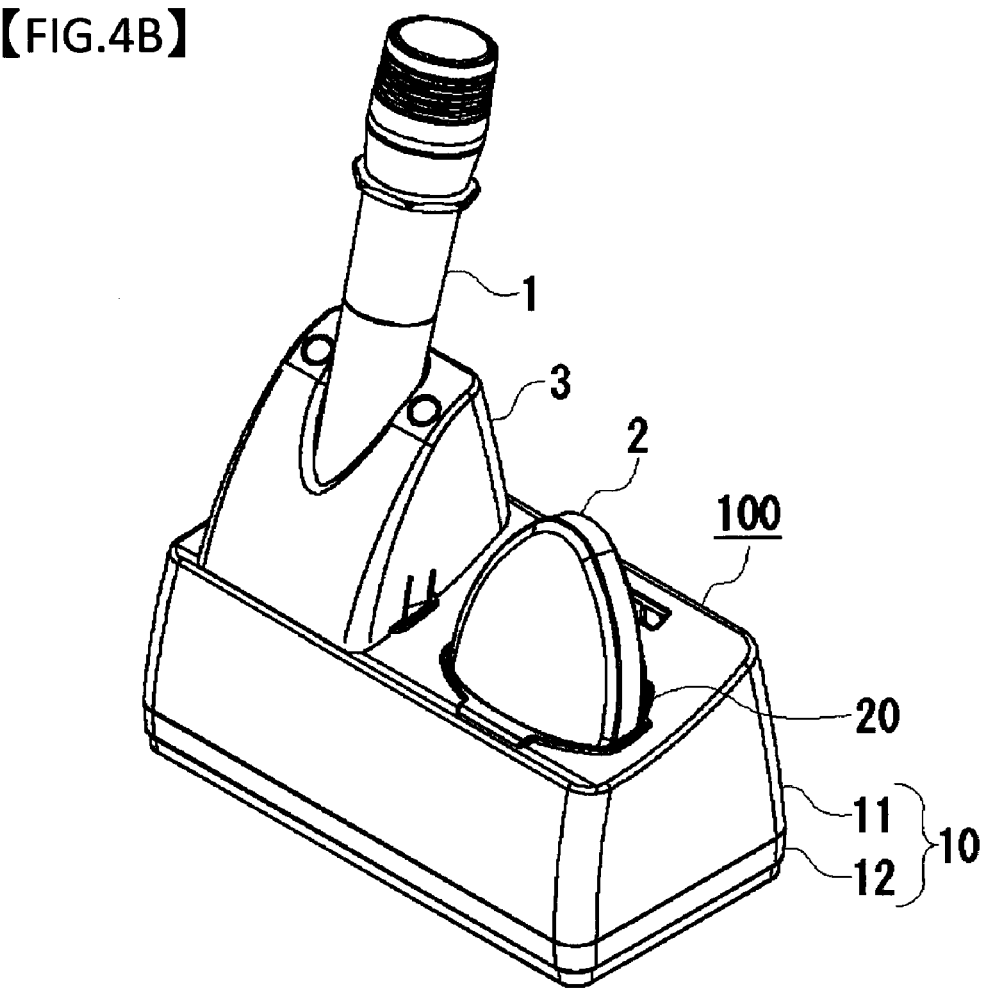
【FIG.5A】
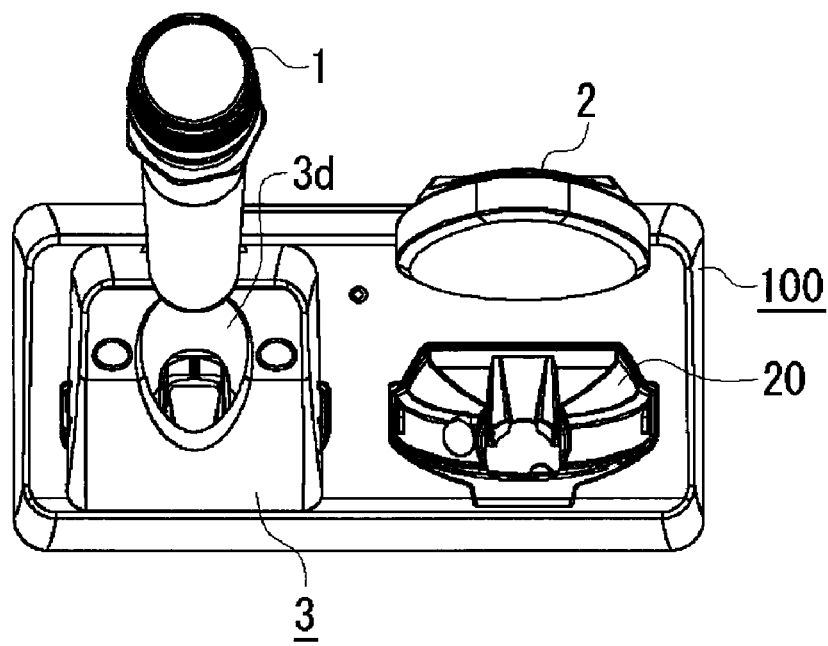

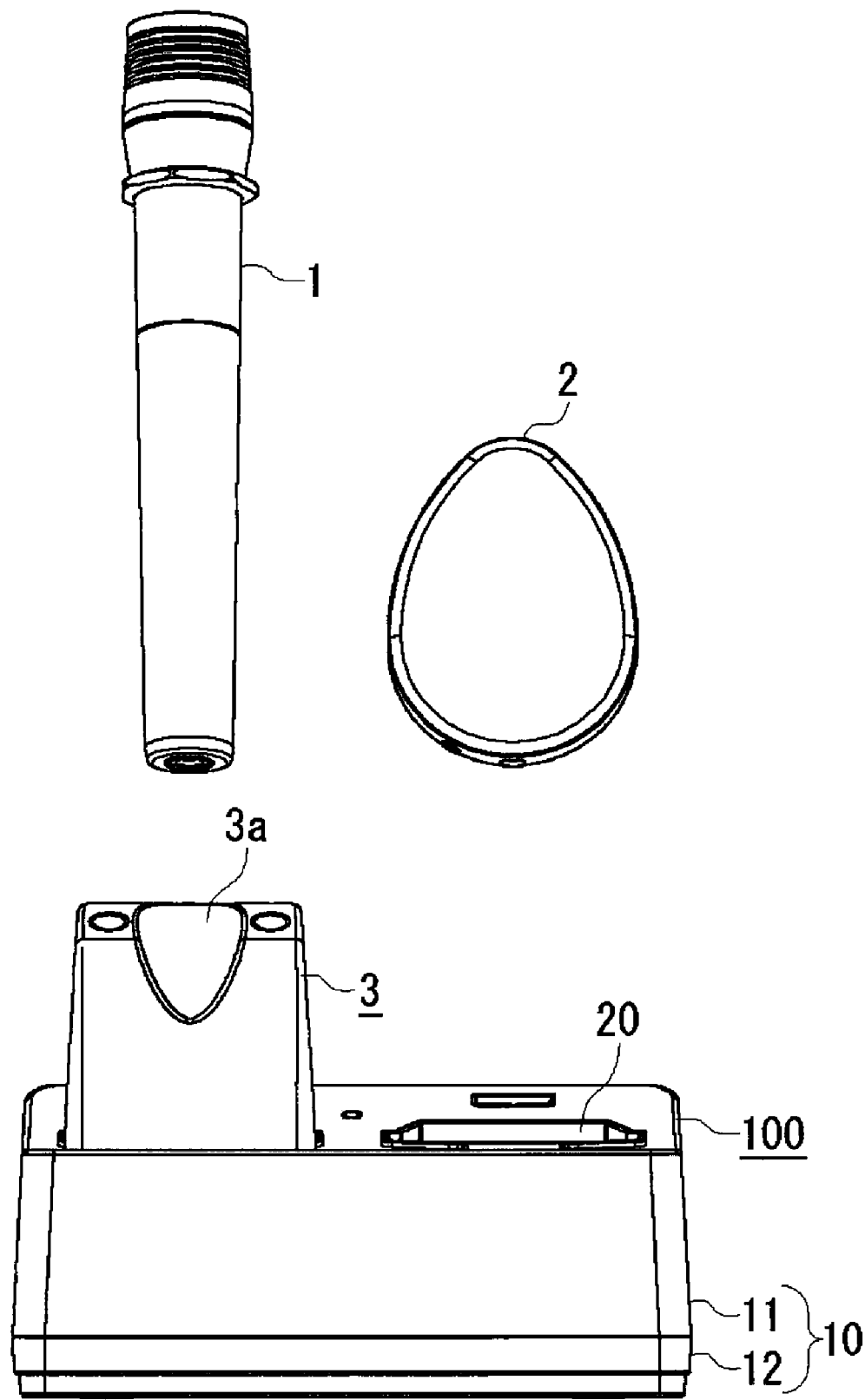
[FIG.5B]

[FIG.5C]
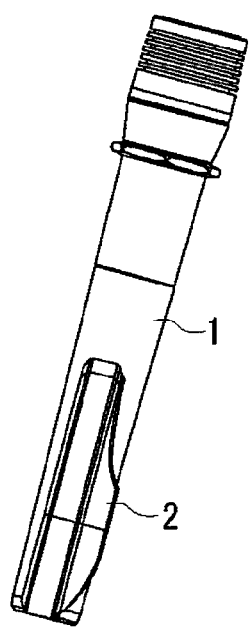
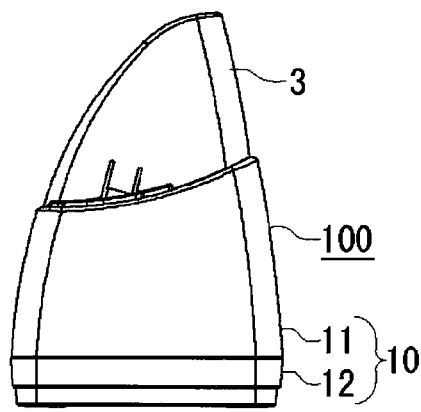
[FIG.6A]
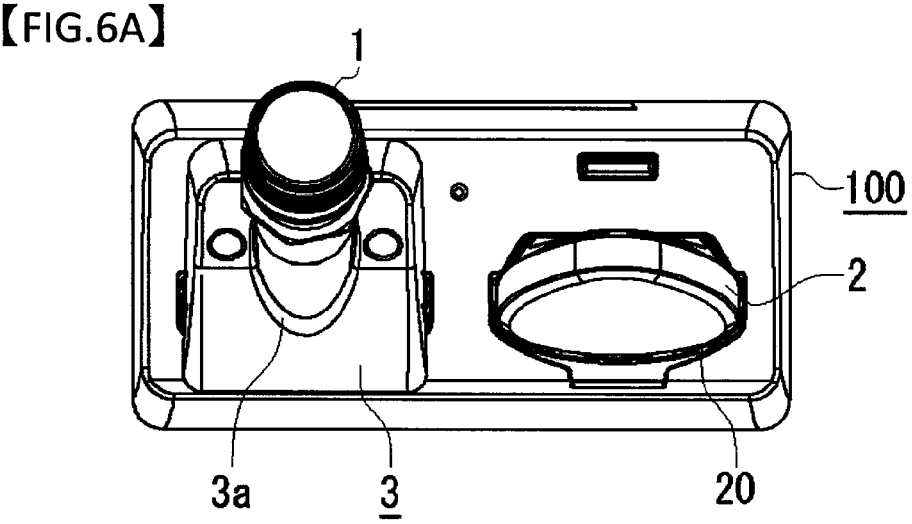

[FIG.6B]
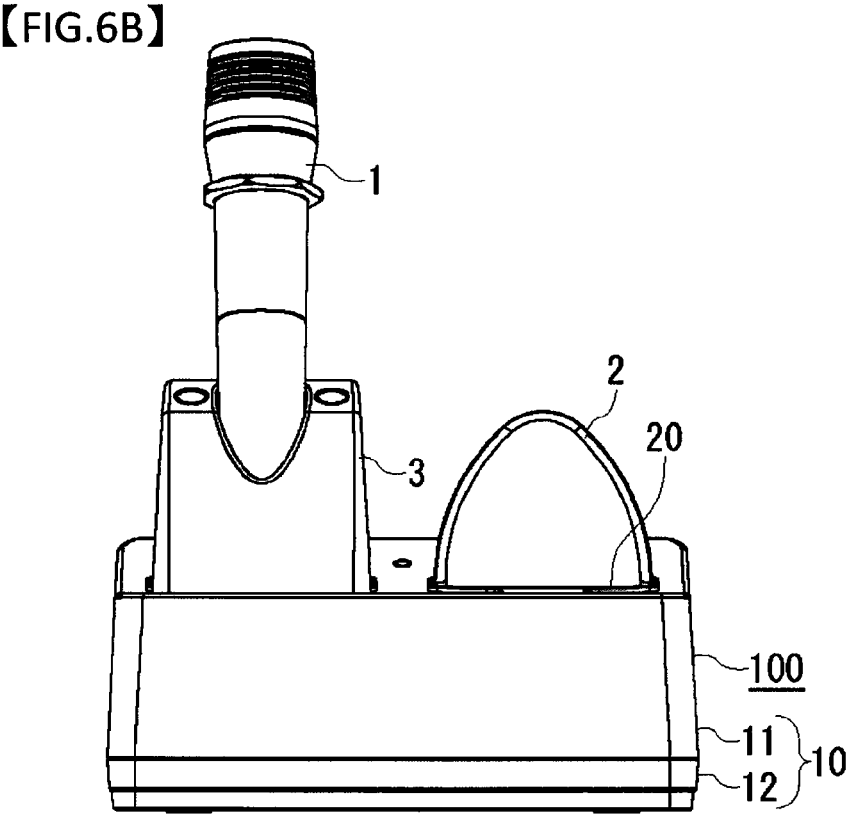
[FIG.6C]
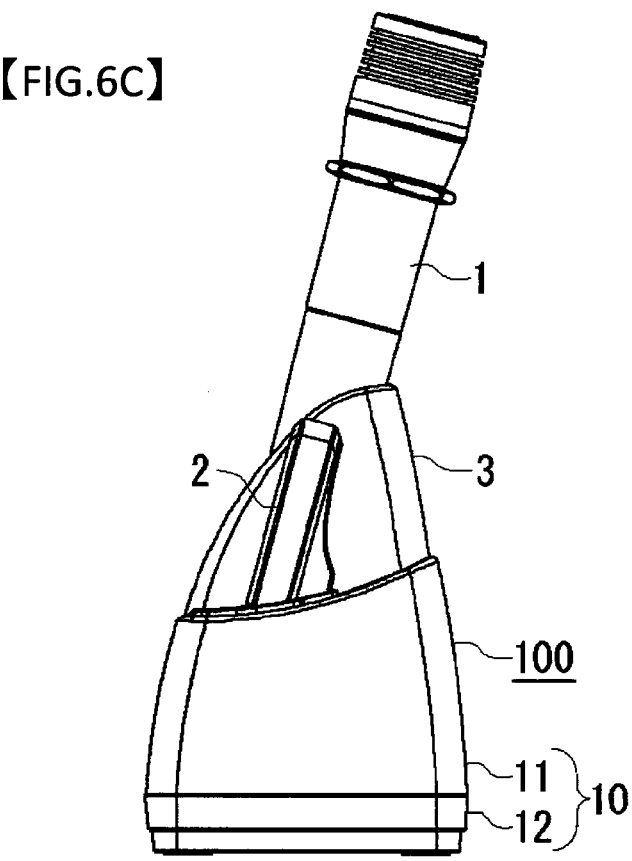

【FIG.7】
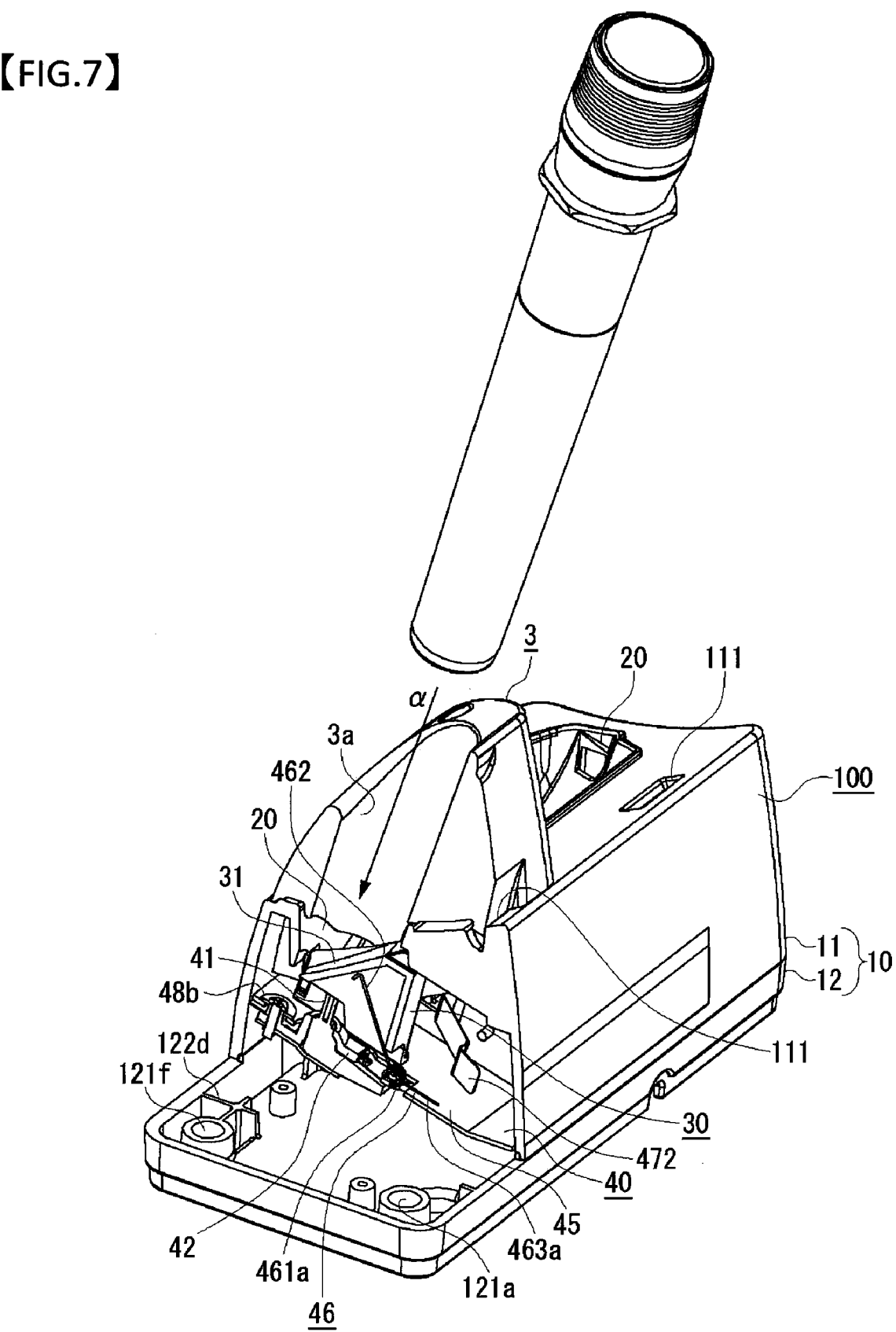
CLOSED STATE

【FIG.8】
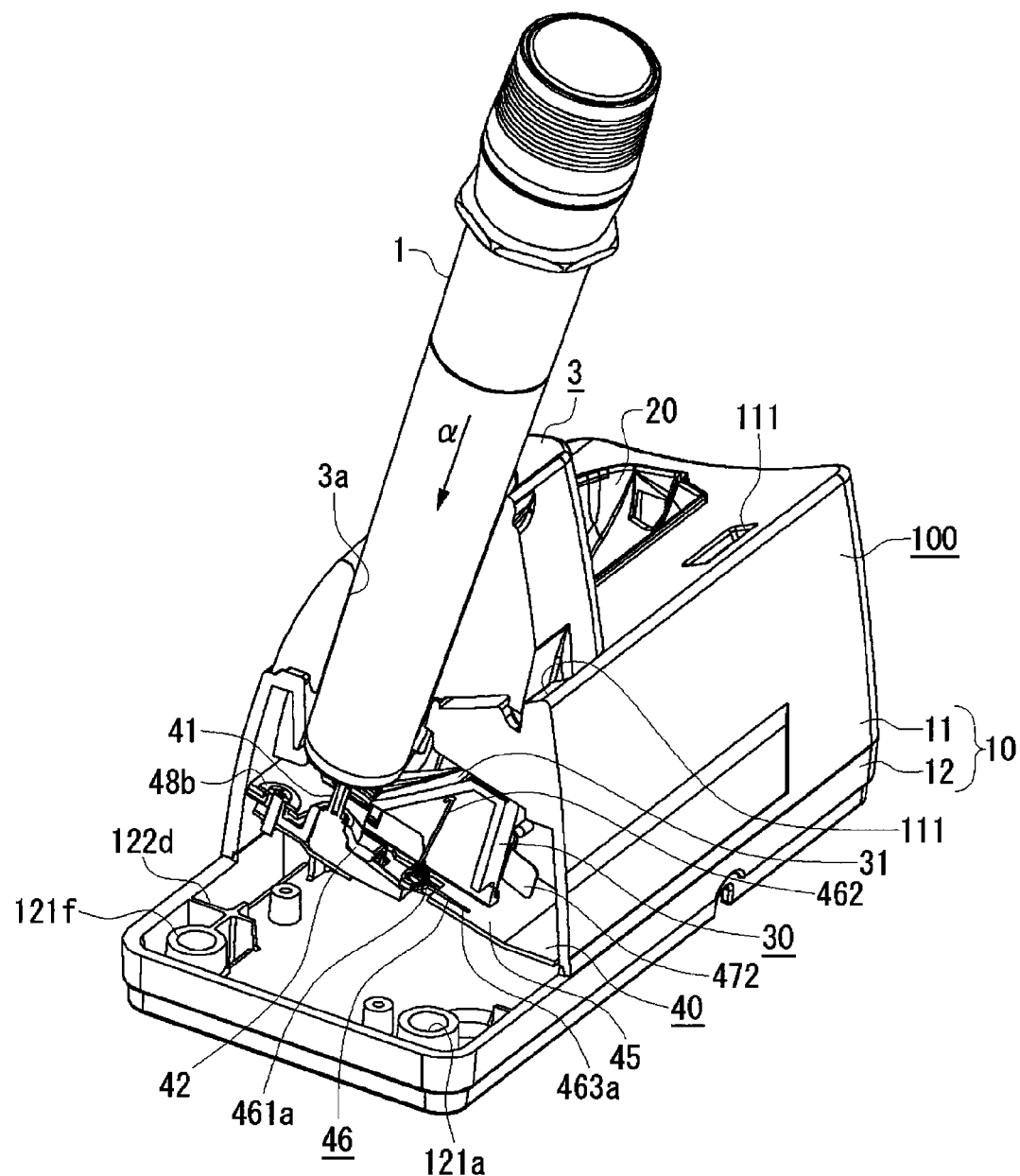
INTERMEDIATE STATE

【FIG.9】
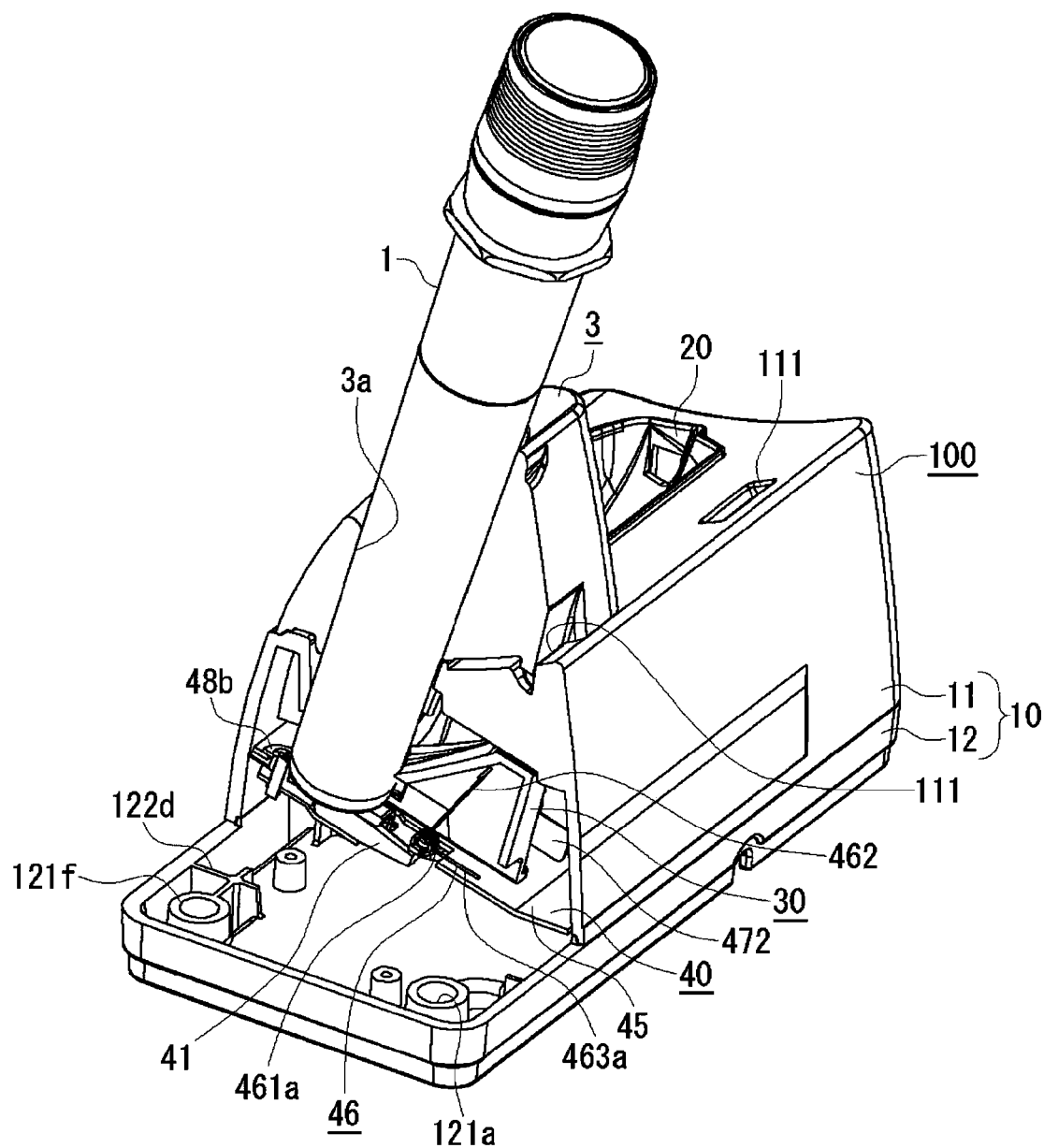
OPEN STATE

[FIG.10A]
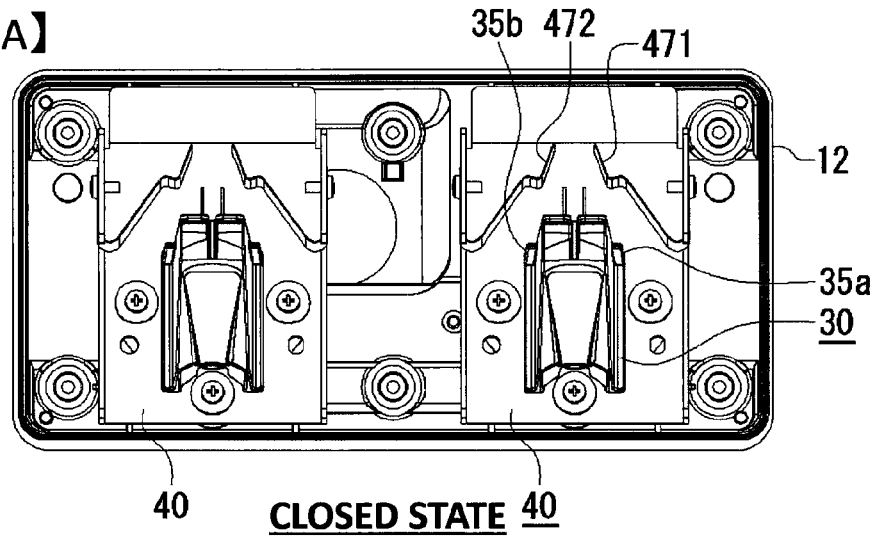
CLOSED STATE
[FIG.10B]
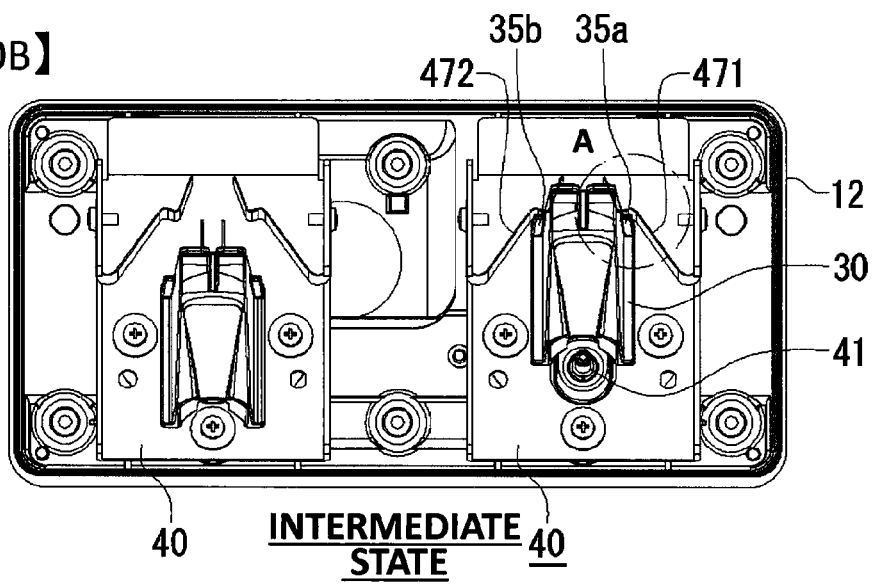
INTERMEDIATE STATE
[FIG.10C]
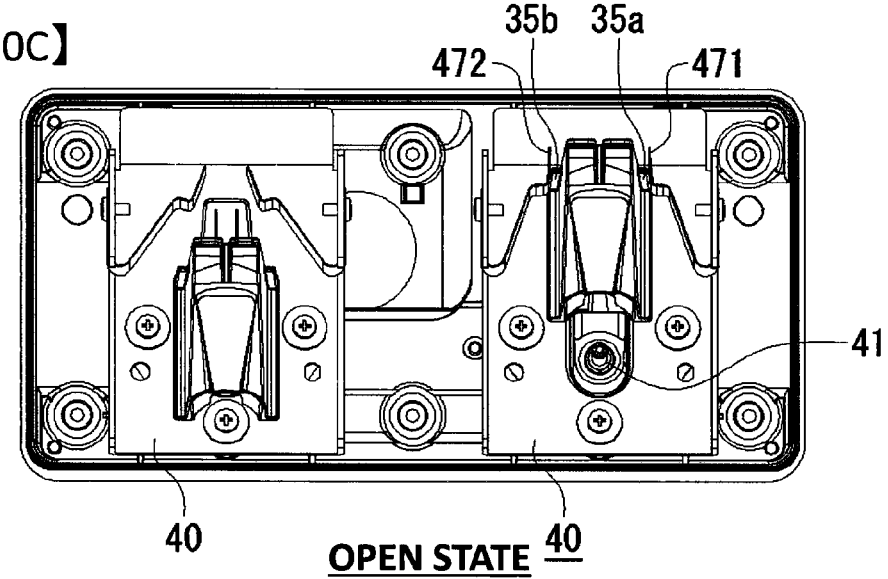
OPEN STATE 【FIG.11】
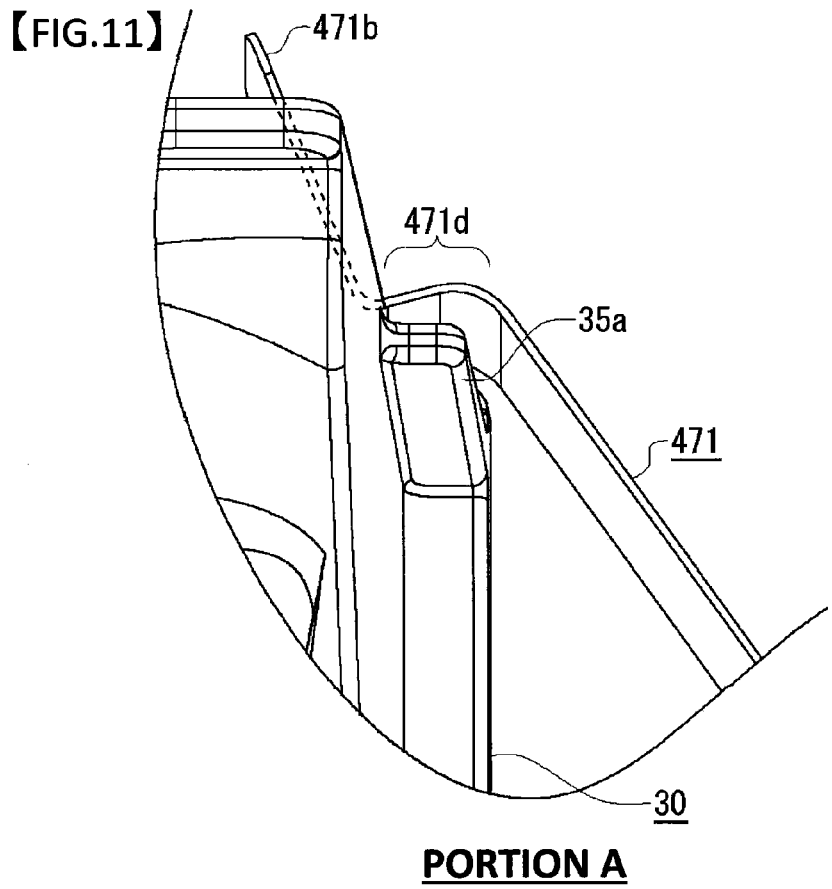
PORTION A
【FIG.12A】
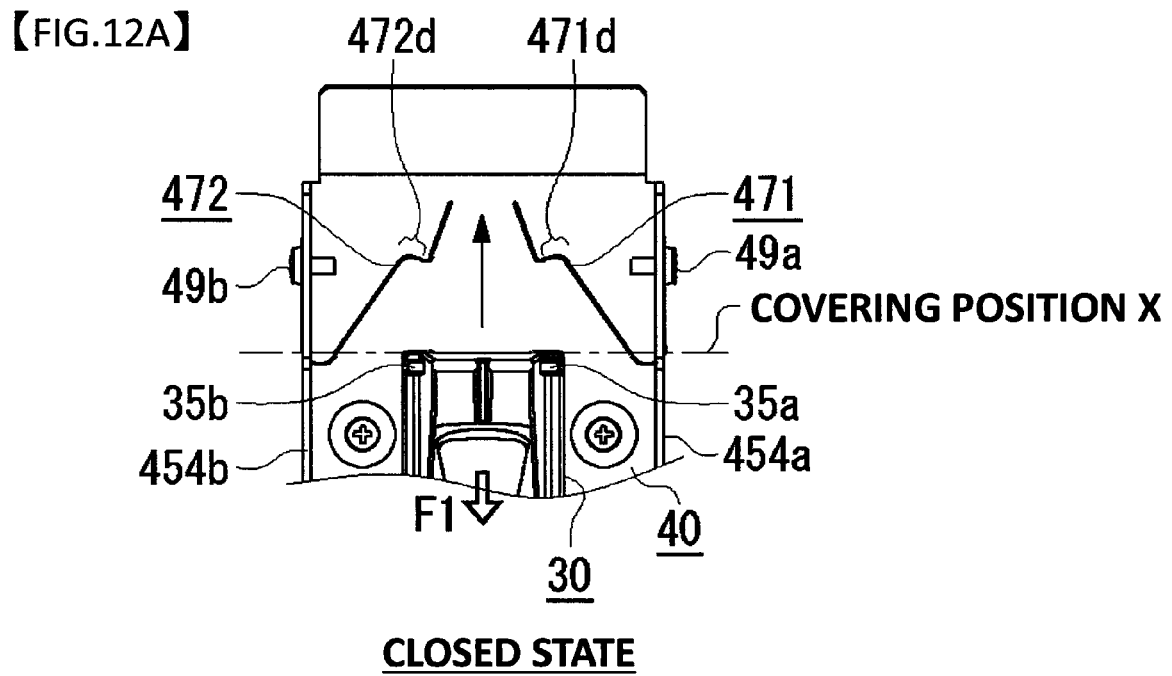
CLOSED STATE

[FIG.12B]
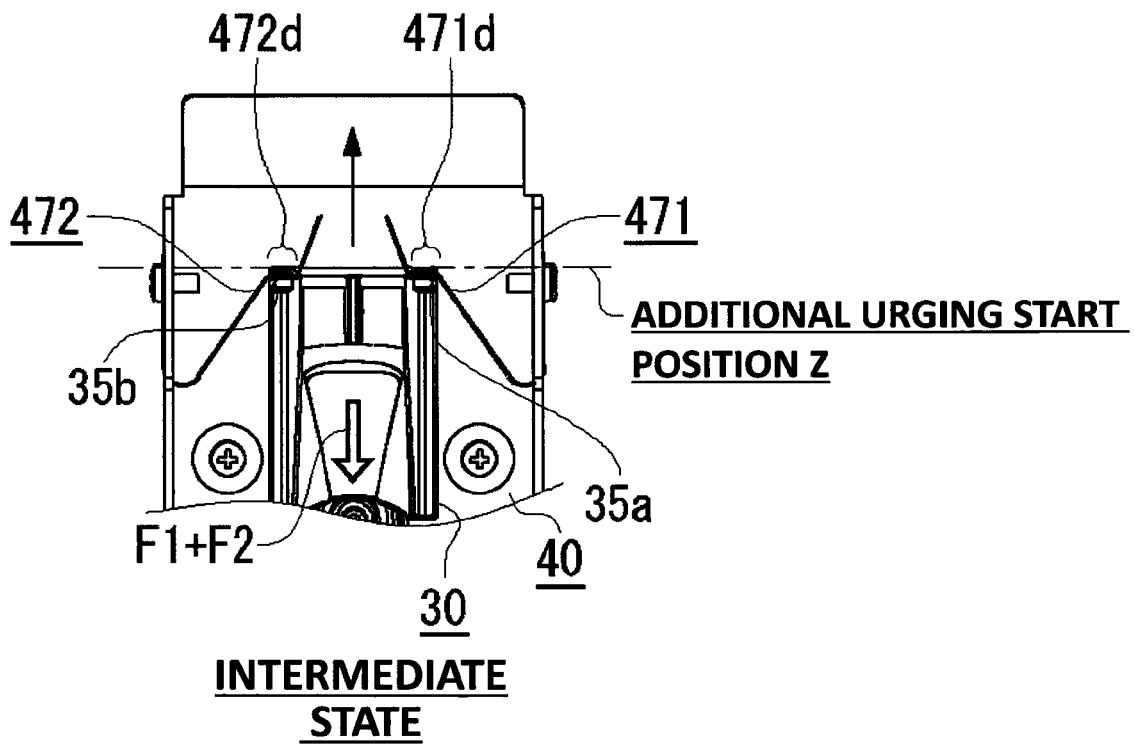
INTERMEDIATE STATE
[FIG.12C]
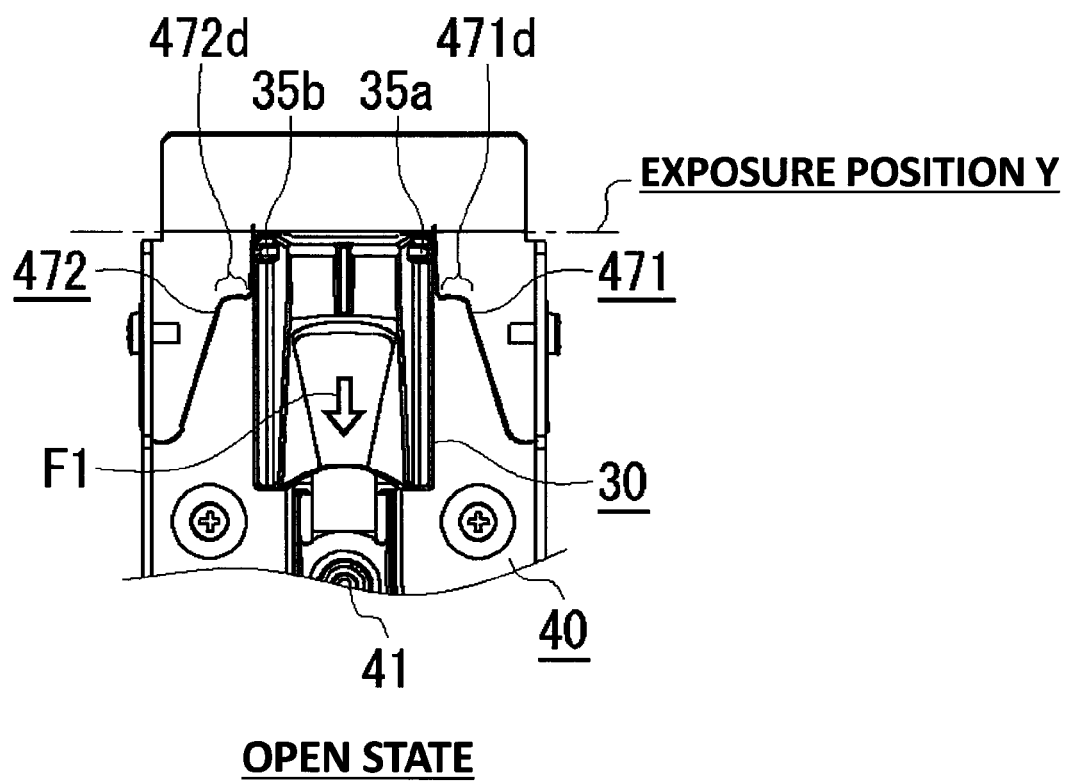
OPEN STATE

CONNECTION DEVICE TO WHICH ELECTRIC DEVICE IS CONNECTED AND HAVING DUST-PROOF FUNCTION

RELATED APPLICATION

This application claims the benefit of Japanese Patent Application No. 2007-51111 filed in Japan on Mar. 1, 2007, the subject matter of which is incorporated herein by reference.

TECHNICAL FIELD

The present invention relates to an electric appliance connection device in which an electric appliance having a connection-target terminal is set and, more particularly, to an electric appliance connection device having a dustproofing function.

BACKGROUND ART

An electric appliance connection device in which an electric appliance is set has been widely used. The electric appliance is, for example, a microphone device, a portable telephone or an electronic pocket notebook. The electric appliance connection device is, for example, a charging device for giving a charge of electricity to the electric appliance. According to this technique, the electric appliance has a connection-target terminal connected to a secondary battery. The charging device has a connection terminal connected to the connection-target terminal of the electric appliance. By setting the electric appliance on the charging device, the connection-target terminal of the electric appliance is connected to the connection terminal of the charging device to charge the secondary battery in the electric appliance.

If in this charging device the connection terminal is exposed when the electric appliance is not set, there is possibility of dust being attached to the connection terminal to cause connection failure between the connection terminal and the connection-target terminal.

In Japanese Patent Laid-Open No. 2004-147360, a charging device is proposed in which a dustproof shutter (slide cover 21) covering a connection terminal (a charging terminal 12) is provided to protect the connection terminal from attachment of dust. In this related art, the dustproof shutter covers the charging terminal when a battery pack is not set on the charging device. When the battery pack is set on the charging device, the charging terminal is exposed by being linked to the battery pack setting operation.

Also, according to Japanese Patent Laid-Open No. 2004-147360, an arrangement for connecting a connection-target terminal (charging terminal 12 of the battery pack) to a connection terminal (a charging terminal 45 of a charger) with reliability when a battery pack is set on a charging device is provided to avoid connection failure between the connection-target terminal and the connection terminal. This device includes a fitting claw (claw 50) provided on a casing of the battery pack and a fitting recess (recess 5a) provided in a casing of the charging device. When the battery pack is set on the charging device, the fitting claw of the battery pack and the fitting hole of the charging device are fitted to each other. An operator is informed that the battery pack is set on the charging device through a feeling of clicking or a clicking sound which the operator perceives when the fitting claw and the fitting recess are fitted to each other.

The electric appliance connection device described in Japanese Patent Laid-Open No. 2004-147360 requires no manual operation for moving the dustproof shutter and is advantageous in terms of operational convenience. However, it is necessary to provide a fitting structure using, for example, a fitting claw and a fitting recess on the casing of the electric appliance or the charging device in order to ensure reliable connection between the connection-target terminal and the connection terminal.

DISCLOSURE OF THE INVENTION

Problem to be Solved by the Invention

The present invention has been achieved under the above-described circumstances. An object of the present invention is to provide an electric appliance connection device having a dustproofing function and capable of improving the convenience of the operation and reducing the occurrence of connection failure between a connection-target terminal of an electric appliance and a connection terminal without requiring a complicated structure such as a fitting structure.

Means for Solving the Problem

An electric appliance connection device having a dustproofing function according to one aspect of the present invention includes a casing having a setting portion in which an electric appliance having a connection-target terminal is set, a connection terminal connected to the connection-target terminal when the electric appliance is set in the setting portion, a covering member provided to cover the connection terminal, and capable of moving between a covering position and an exposure position with an operation to set the electric appliance in the setting portion and with an operation to draw off the electric appliance from the setting portion, the covering member covering the connection terminal at the covering position, the covering member exposing the connection terminal at the exposure position, a first urging member which applies a fundamental urging force to the covering member between the covering position and the exposure position in a direction from the exposure position toward the covering position; and a second urging member which applies an additional urging force to the covering member in addition to the fundamental urging force by urging the covering member in an additional urging section provided between the covering position and the exposure position in a direction from the exposure position toward the covering position, and thereby sets the covering member in an additionally urged state, the second urging member releasing the covering member from the additionally urged state in which the covering member is urged by the second urging member when the covering member reaches the end of the additional urging section.

According to the present invention, the first and second urging members are provided as described above to enable improving the operational convenience and reducing the occurrence of connection failure between the connection-target terminal of the electric appliance and the connection terminal without requiring a complicated arrangement such as a fitting structure.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

FIG. 1 is an exploded perspective view showing the internal construction of a microphone charging device in an embodiment of the present invention;

FIG. 2 is a perspective view of an external appearance of the microphone charging device in the embodiment of the present invention;

FIG. 3 is an exploded perspective view of a charging terminal assembly;

FIG. 4A is a perspective view showing a state before setting a microphone device on the microphone charging device;

FIG. 4B is a perspective view showing a state after setting the microphone device on the microphone charging device;

FIG. 5A is a top view showing the state before setting the microphone device on the microphone charging device;

FIG. 5B is a front view showing the state before setting the microphone device on the microphone charging device;

FIG. 5C is a side view showing the state before setting the microphone device on the microphone charging device;

FIG. 6A is a top view showing a state after setting the microphone device on the microphone charging device;

FIG. 6B is a front view showing a state after setting the microphone device on the microphone charging device;

FIG. 6C is a side view showing a state after setting the microphone device on the microphone charging device;

FIG. 7 is a sectional perspective view showing a dustproof shutter closed state;

FIG. 8 is a sectional perspective view showing a dustproof shutter intermediate state;

FIG. 9 is a sectional perspective view showing a dustproof shutter open state;

FIG. 10A is a top view showing the dustproof shutter closed state;

FIG. 10B is a top view showing the dustproof shutter intermediate state;

FIG. 10C is a top view showing the dustproof shutter open state;

FIG. 11 an enlarged view of a portion around a plate spring abutment portion of the dustproof shutter in the dustproof shutter intermediate state;

FIG. 12A is a top view showing the placement relationship between the dustproof shutter and plate springs in a dustproof shutter closed state;

FIG. 12B is a top view showing the placement relationship between the dustproof shutter and the plate springs in a dustproof shutter intermediate state; and FIG. 12C is a top view showing the placement relationship between the dustproof shutter and the plate springs in a dustproof shutter open state.

DESCRIPTION OF SYMBOLS 1, 2 Microphone device
3 Adapter
10 Casing
11 Upper casing
113 Projecting guide rail
12 Lower casing
20 Setting portion
30 Dustproof shutter
31 Slide slanting face
32 Terminal opening
33 Guided groove
35, 35a, 35b Plate spring abutment portion
36 Torsion spring abutment surface
40 Charging terminal assembly
41 Charging terminal portion
46 Torsion spring
461a, 461b Coil-axis portion
471, 472 Plate spring
471a, 472a Mount portion
471b, 472b Distal end portion
471d, 472d Stepped portion
100 Microphone charging device

BEST MODE FOR CARRYING OUT THE INVENTION

The present invention will be described below in detail. The following detailed description and the accompanying drawings do not limit the invention. Instead, the scope of the invention is specified by the appended claims.

An electric appliance connection device having a dustproofing function according to the present invention includes a casing having a setting portion in which an electric appliance having a connection-target terminal is set, a connection terminal connected to the connection-target terminal when the electric appliance is set in the setting portion, a covering member provided to cover the connection terminal, and capable of moving between a covering position and an exposure position with an operation to set the electric appliance in the setting portion and with an operation to draw off the electric appliance from the setting portion, the covering member covering the connection terminal at the covering position, the covering member exposing the connection terminal at the exposure position, a first urging member which applies a fundamental urging force to the covering member between the covering position and the exposure position in a direction from the exposure position toward the covering position; and a second urging member which applies an additional urging force to the covering member in addition to the fundamental urging force by urging the covering member in an additional urging section provided between the covering position and the exposure position in a direction from the exposure position toward the covering position, and thereby sets the covering member in an additionally urged state, the second urging member releasing the covering member from the additionally urged state in which the covering member is urged by the second urging member when the covering member reaches the end of the additional urging section.

In this arrangement, the first urging member urging the covering member is provided. By being linked to the operation to set the electric appliance or an operation to draw off the electric appliance, the covering member is moved to expose or cover the connection terminal. The operational convenience is therefore improved. Also, the second urging member is provided as well as the first urging member. In the process of moving the covering member, the additional urging force of the second urging member is added to the fundamental urging force of the first urging member in the additional urging section, thereby increasing the setting force for setting the electric appliance. When the covering member reaches the end of the additional urging section, the covering member is released from the state of being additionally urged by the second urging member, thereby enabling the connection terminal and the connection-target terminal to be forcibly connected to each other by the strong setting force immediately before the release. In this way, the occurrence of connection failure between the connection-target terminal of the electric appliance and the connection terminal can be reduced without requiring a complicated arrangement such as a fitting structure. Thus, the operational convenience is improved and the occurrence of connection failure between the connection-target terminal of the electric appliance and the connection terminal can be reduced without requiring a complicated arrangement such as a fitting structure.

The covering member may have an abutment portion which is brought into abutment on the second urging member;

the second urging member may be constituted by a plate spring held on the casing; the plate spring may extend from the covering position toward the exposure position and have a stepped portion bent toward the covering member; and the additional urging section may be a section from a position at which the abutment portion is brought into abutment on the stepped portion with the movement of the covering member from the covering position to a position at which the abutment portion surmounts the stepped portion.

With this arrangement, application of a suitable additional urging force to the covering member in the additional urging section can be achieved by means of a simple arrangement in which a plate spring having a stepped portion is provided. As a result, the occurrence of connection failure between the connection-target terminal of the electric appliance and the connection terminal can be reduced without requiring a complicated arrangement such as a fitting structure.

Also, the second urging member may be provided so that when the covering member reaches the end of the additional urging section by moving from the covering position, the setting force for setting the electric appliance in the setting portion against the additional urging force is larger than a terminal connection load for connecting the connection-target terminal to the connection terminal.

With this arrangement, the setting force at the time of setting the electric appliance on the connection device is increased with reliability relative to the terminal connection load for connecting the connection-target terminal to the connection terminal, so that the connection-target terminal can be connected to the connection terminal with reliability. As a result, the occurrence of connection failure between the connection-target terminal of the electric appliance and the connection terminal can be reduced.

An electric appliance connection device in an embodiment of the present invention will be described with reference to the drawings. In the present embodiment, the electric appliance connection device is a charging device for a microphone. FIGS. 1 to 3 show the construction of the microphone charging device in the present embodiment. FIGS. 4A to 6C show the relationship between the microphone charging device and the microphone device set on the microphone charging device. For ease of description, description will first be made of the entire construction including the microphone charging device and the microphone device with reference to FIGS. 4A to 6C and detailed description will next be made of the construction of the microphone charging device with reference to FIGS. 1 to 3.

As shown in FIGS. 4A to 6C, a microphone charging device 100 in the present embodiment is constructed so that microphone devices 1 and 2 can be set on the microphone charging device 100. The microphone devices 1 and 2 are an example of the electric appliance (or device) of the present invention. The microphone devices 1 and 2 incorporate rechargeable secondary batteries (not shown in the figures). The microphone device 1 is a handheld microphone used by being held in a hand. The microphone device 2 is a pendant-type microphone used by being suspended, for example, from a neck with a string.

The microphone charging device 100 as an electric appliance connection device having a dustproofing function has setting portion 20 in an upper surface of a casing 10. The microphone devices 1 and 2 are set in the setting portion 20. An adapter 3 can be mounted in each of the setting portions 20. The adapter 3 is used when the handheld-type microphone device 1 is set in the setting portion 20. A through hole 3a is formed in the adapter 3. A grip portion of the microphone device 1 is inserted in the through hole 3a. The inside diameter of the through hole 3a is set in correspondence with the outside diameter of the grip portion of the microphone device 1. The handheld-type microphone device 1 and the pendant-type microphone device 2 can be set on the microphone charging device 100, as mentioned above. Description will be made below mainly of a case where handheld microphone device is set.

The construction of the microphone charging device 100 in the embodiment of the present invention will next be described. FIG. 1 is an exploded perspective view showing the internal construction of the microphone charging device. FIG. 2 is a perspective view of an external appearance. The microphone charging device 100 has the casing 10, a dustproof shutter 30, and a charging terminal assembly 40. The casing 10 is constituted by an upper casing 11 and a lower casing 12. The upper casing 11 and the lower casing 12 are fitted to each other to house the dustproof shutter 30 and the charging terminal assembly 40 in the casing 10. In the following description, a front surface side of the casing 10 is referred to as a front side, and a back surface side of the casing 10 is referred to as rear side.

The upper casing 11 has the setting portion 20, a mount recess 111, a shutter opening 112 and a projecting guide rail 113. The setting portion 20 is a recessed portion formed in the upper surface of the upper casing 11. The microphone device 1 is set in the setting portion 20, as mentioned above. The mount recess 111 is a recess formed in the upper surface of the upper casing 11 and is used to mount the above-described adapter 3 in the setting portion 20.

The shutter opening 112 is formed in the upper casing 11 inside the setting portion 20. When the dustproof shutter 30 is housed in the casing 10, the dustproof shutter 30 is movably fitted in the shutter opening 112. The dustproof shutter 30 is thus placed inside the setting portion 20 in recessed form. The projecting guide rail 113 is constituted by a projection formed on an inner wall surface of an upper portion of the shutter opening 112 in the upper casing 11 so as to extend in the direction from the front side toward the rear side of the upper casing 11. The projecting guide rail 113 is fitted in a guided groove 33 of the dustproof shutter 30 to regulate the direction in which the dustproof shutter 30 moves.

The dustproof shutter 30 is an example of the covered member of the present invention. The dustproof shutter 30 is mounted on the charging terminal assembly 40 to cover a charging terminal portion 41 described below. The dustproof shutter 30 is formed by resin molding. The dustproof shutter 30 has a slide slanting face 31, a terminal opening 32, the guided groove 33, and a pair of plate spring abutment portions 35.

As shown in FIG. 1, the slide slanting face 31 is provided in an upper surface of the dustproof shutter 30. The slide slanting face 31 is formed so that its height from a bottom portion 34 increases with approach from the front side toward the read side of the casing 10. Also, the slide slanting face 31 is provided so that a lower end portion of the microphone device 1 slides on the surface of the slide slanting face 31 when the microphone device 1 is set in the setting portion. With this arrangement, when the microphone device 1 is pressed against the slide slanting face 31 in the operation to set the microphone device 1, the dustproof shutter 30 moves rearward and the lower end portion of the microphone device 1 slides downward on the slide slanting face 31 in a state of being in contact with the surface of the slide slanting face 31.

The terminal opening 32 is provided in a lower portion of a front side wall surface of the dustproof shutter 30. The terminal opening 32 is a cut having a shape corresponding to the shape of the charging terminal portion 41 described below. With the movement of the dustproof shutter 30, the charging terminal portion 41 passes through the terminal opening 32 to be covered or exposed.

The guided groove 33 is constituted by a groove formed in the upper surface of the dustproof shutter 30 so as to extend from the font side toward the rear side. The guided groove 33 is fitted to the projecting guide rail 113 in the upper casing 11 to regulate the direction of movement of the dustproof shutter 30. Thus, the dustproof shutter 30 is made movable in the direction from the front side toward the rear side or in the direction opposite to this. The pair of plate spring abutment portions 35 are respectively formed on rear-end lower portions of two side surfaces of the dustproof shutter 30. Each plate spring abutment portion 35 is an elongated projection extending in the top-bottom direction. The pair of plate spring abutment portions 35 are provided so as to be brought into abutment on a pair of plate springs 471 and 472 described below.

The construction of the charging terminal assembly 40 will be described in detail with reference to the drawings. FIG. 3 is an exploded perspective of the charging terminal assembly 40. As shown in FIG. 3, the charging terminal assembly 40 has the charging terminal portion 41, an upper terminal case 42, a lower terminal case 43, a sound absorbing sheet 44, a base plate 45, a torsion spring 46, and the pair of plate springs 471 and 472. The lower terminal case 43, the charging terminal portion 41, the upper terminal case 42, the sound absorbing sheet 44 and the base plate 45 are superposed one on another and fastened with screws 48a to 48c. The charging terminal assembly 40 is held in the casing 10 by being mounted on a plurality of charging terminal assembly mount bosses 122a to 122d on the lower casing 12 described below.

The charging terminal portion 41 is an example of the connection terminal of the present invention. The charging terminal portion 41 is connected to an electricity receiving terminal for charging provided in the microphone device 1 when the microphone device 1 is set in the setting portion 20. The electricity receiving terminal is an example of the connection-target terminal of the present invention. The charging terminal portion 41 is a cylindrical connector such as shown in FIG. 3. The charging terminal portion 41 is connected to a power supply connector capable of being connected to an external power supply via a power supply cable or the like. The charging terminal portion 41 is not limited to the connector structure shown in FIG. 3. The charging terminal portion 41 may have a connector structure other than that shown in FIG. 3.

The upper terminal case 42 and the lower terminal case 43 are constructed as to be capable of holding the charging terminal portion 41 by pinching the charging terminal portion 41 between their inner surfaces. Screw holes 431a to 431c are formed in the lower terminal case 43. Mount screws 48a to 48c are passed through holes 421a to 421c in the upper terminal case 42 and fastened to the lower terminal case 43. The upper terminal case 42 has a projecting portion 422 at its center. A through hole 423 is formed in the projecting portion 422, and a tip end of the charging terminal portion 41 is passed through the through hole 423. A recess 432 in which the charging terminal portion 41 is placed is formed in the inner surface of the lower terminal case 43.

The sound absorbing sheet 44 is interposed between the upper terminal case 42 and the base plate 45. The sound absorbing sheet 44 is provided for the purpose of absorbing impact sound accompanying the microphone device 1 setting operation. Holes 441a to 441c for the mount screws 48a to 48c and a through hole 442 are formed in the sound absorbing sheet 44. The projecting portion 422 of the upper terminal case 42 is placed inside the through hole 442. The sound absorbing sheet 44 is formed of an elastic sheet, e.g., a natural rubber sheet or the like.

The base plate 45 is placed on the sound absorbing sheet 44. The base plate 45 is provided so that the sound absorbing sheet 44 is pinched between the base plate 45 and the upper terminal case 42. Holes 451a to 451c for the mount screws 48a to 48c are formed in a bottom plate 453 in the base plate 45. A through hole 452 is also formed in the bottom plate 453 in the base plate 45. The projecting portion 422 of the upper terminal case 42 is placed in the through hole 452. The base plate 45 has a pair of side wall portions 454a and 454b, in which screw holes 455a and 455b are respectively formed. The screw holes 455a and 455b are provided for mounting the plate springs 471 and 472. The bottom plate 453 in the base plate 45 has a torsions spring mount portion 456 for mounting the torsion spring 46.

The torsion spring 46 is an example of the first urging member of the present invention. The torsion spring 46 is a spring which receives torsional loads about coil-axis portions 461a and 461b. The coil-axis portions 461a and 461b are mounted on the torsion spring mount portion 456 of the base plate 45. The torsion spring 46 has a first end portion 462 and second end portions 463a and 463b. The first end portion 462 is U-shaped. The first end portion 462 and the second end portions 463a and 463b are disposed about the coil-axis portions 461a and 461b opposite from each other. That is, the first end portion 462 is provided on one side, and the second end portions 463a and 463b are provided on the other side. The first end portion 462 connects the two coil-axis portions 461a and 461b. The torsion spring 46 is thus formed as one part. When the coil-axis portions 461a and 461b are mounted on the torsion spring mount portion 456 of the base plate 45, the second end portions 463a and 463b are brought into abutment on the bottom plate 45 in the base plate 45 and the first end portion 462 is brought into abutment on the dustproof shutter 30, thereby causing the torsion spring 46 to urge the dustproof shutter 30 toward the front side.

The pair of plate springs 471 and 472 are an example of the second urging member of the present invention. The pair of plate springs 471 and 472 are formed of elastic members made of, for example, phosphor bronze or the like. Proximal end portions of the plate springs 471 and 472 are bent to form mount portions 471a and 471b. Holes 471c and 472c for mount screws 49a and 49b are formed in the mount portions 471a and 472a. The mount portions 471a and 472a are fixed on side wall portions 455a and 455b of the base plate 450 by being fastened with the mount screws 49a and 49b at a position slightly shifted rearward relative to the charging terminal portion 41. The plate springs 471 and 472 are thus held on the casing 10 by means of the charging terminal assembly 40.

The plate springs 471 and 472 are placed so as to extend in such a direction as to be distanced away from the charging terminal portion 41, i.e., in the direction from the front side toward the rear side of the casing 10. The plate springs 471 and 472 extend obliquely toward the rear side and toward the dustproof shutter 30. The plate springs 471 and 472 are bent at positions close to distal end portions 471a and 472b to provide stepped portions 471d and 472d. The stepped portions 471d and 472d are in such a structure that they are bent toward the dustproof shutter 30 and then again bent in the direction toward the rear side.

The plate springs 471 and 472 are placed in such a place as not to contact the dustproof shutter 30, before the dustproof shutter 30 is moved rearward by the microphone device 1 setting operation. The plate springs 471 and 472 and the stepped portions 471d and 472d are placed so that when the dustproof shutter 30 is slid rearward, the stepped portions 471d and 472d are brought into abutment on the plate spring abutment portions 35 of the dustproof shutter 30.

When the dustproof shutter 30 is brought into abutment on the stepped portions 471d and 472d, the urging forces of the plate springs 471 and 472 are applied to the dustproof shutter 30. As the dustproof shutter 30 is further moved, the stepped portions 471d and 472d are pushed to bend and deform the plate springs 471 and 472. The dustproof shutter 30 is further moved rearward over the stepped portions 471d and 472d, finally exposing the charging terminal portion 41.

The lower casing 12 has a plurality of upper casing mount bosses 121a to 121f and a plurality of charging terminal assembly mount bosses 122a to 122d. The plurality of upper casing mount bosses 121a to 121f are bosses in cylindrical column form standing upright in a direction generally perpendicular to a bottom surface 123 of the lower casing 12. Mount holes 124a to 124f are respectively formed in the upper casing mount bosses 121a to 121f at centers of the same. The charging terminal assembly mount bosses 122a to 122d extend from the bottom surface 123 in a direction generally perpendicular to the bottom surface 123. The upper casing 11 and the lower casing 12 are assembled by being fitted to each other by using the upper casing mount bosses 121a to 121f. At this time, the charging terminal assembly 40 is pinched between the upper casing 11 and the lower casing 12 and supported on the distal ends of the charging terminal assembly mount bosses 122a to 122d, thus holding the charging terminal assemblies 40 in the casing 10.

The constructions of the components of the microphone charging device 100 according to the present embodiment have been described. In the present embodiment, as described above, the dustproof shutter 30 is urged by the two types of urging members: the torsion spring 46, which is the first urging member, and the plate springs 471 and 472, which are the second urging members. The urging forces of these urging members and the positions at which they act are set as described below.

For explanation of the urging force acting positions, the position of the dustproof shutter 30 is first defined as described below. The position of the dustproof shutter 30 before movement at the time of setting of the microphone device 1, i.e., the position at which the dustproof shutter 30 covers the charging terminal portion 41, will be referred to as "covering position X". The position of the dustproof shutter 30 when the microphone setting is completed, i.e., the position at which the dustproof shutter 30 exposes the charging terminal portion 41, will be referred to as "exposure position Y".

A section in which the urging forces of the plate springs 471 and 472 are applied to the dustproof shutter 30 will be referred to as "additional urging section". This additional urging section is a section through which the dustproof shutter 30 moves from the point at which the plate spring abutment portions 35 of the dustproof shutter 30 are brought into abutment on the stepped portions 471d and 472d of the plate springs 471 and 472 to the point at which the plate spring abutment portions 35 surmount the stepped portions 471d and 472d.

The torsion spring 46 applies the urging force to the dustproof shutter 30 in the entire range from the covering position X to the exposure position Y. This urging force will be referred to as "fundamental urging force F1". The urging forces of the plate springs 471 and 472 are added to the fundamental urging force F1 of the torsion spring 46 at an intermediate point. The urging forces of the plate springs 471 and 472 will be referred to as "additional urging force F2".

The additional urging force F2 is applied in the above-described additional urging section. The dustproof shutter 30 is released from the corresponding additionally urged state at the end of the additional urging section (the additionally urged state is cancelled and terminated).

The fundamental urging force F1 acts to close the dustproof shutter 30 and maintains the dustproof shutter 30 at the covering position X when the microphone is not set. Also, the fundamental urging force F1 acts to return the dustproof shutter 30 from the exposure position Y to the covering position X when the microphone is drawn off. The fundamental urging force F1 is set comparatively small in such a range that these requirements are satisfied, thereby achieving a smooth shutter operation.

The additional urging force F2 is set to such a magnitude that the electricity receiving terminal of the microphone device 1 is connected to the charging terminal portion 41 with reliability. It is necessary that when the microphone device 1 is set, a setting force exceeding the spring urging force is applied to the microphone device 1 in the setting direction. In the additional urging section, the additional urging force F2 of the plate springs 471 and 472 is applied and, therefore, the setting force against the resultant of the additional urging force F2 and the fundamental urging force F1 are applied to the microphone device 1. The setting fore to the microphone device 1 will be referred to as "microphone setting force Fm". Also, the load with which the terminals are connected to each other (the load for connecting or fitting the electricity receiving terminal of the microphone device 1 to the charging terminal portion 41) will be referred to as "terminal connection load Ft". In the present embodiment, the additional urging force F2 is set so that the microphone setting force Fm is equal to or larger than the terminal connection load Ft at the additional urging section end position. As a result, when the dustproof shutter 30 is released from the additionally urged state urged by the plate springs 471 and 472 at the end of the additional urging section, the microphone setting force Fm before the release from the additionally urged state acts on the microphone device 1 and, accordingly, a load equal to or larger than the terminal connection load Ft acts on the microphone device 1.

In the present embodiment, the plate springs 471 and 472 continuously contact the dustproof shutter 30 by the distal end portions 471b and 472b even after the dustproof shutter 30 has surmounted the stepped portions 471d and 472d of the plate springs 471 and 472. Therefore, the urging forces of the plate springs 471 and 472 remain even after the additional urging section, although they are reduced. The urging force of the second urging member may not be reduced to zero outside the additional urging section, within the range according to the present invention, as seen in this example. To be more specific, it is suitable to set the urging force F2 of the second urging member so that the microphone setting force Fm larger than the terminal connection load Ft can be obtained, by considering a reduction in setting force due to the above-described residual urging force.

The operation of the microphone device charging device 100 in the embodiment of the present invention, particularly the operation in which the dustproof shutter is moved according to the microphone device setting operation will be described with reference to FIGS. 7 to 12C. FIG. 7 shows a state before setting the microphone device in the setting portion (hereinafter referred to as "dustproof shutter closed state"). FIG. 8 shows a state halfway in setting the microphone device in the setting portion (hereinafter referred to as "dustproof shutter intermediate state"). FIG. 9 shows a state after setting the microphone device in the setting portion (hereinafter referred to as "dustproof shutter open state").

FIGS. 7 to 9 show the upper casing 11, the adapter 3, the dustproof shutter 30 and the charging terminal assembly 40 in a state of being cut along a cutting line passing through a center of the charging terminal portion 41. Also, FIGS. 7 to 9 show an example of setting the handheld-type microphone device 1 in the setting portion 20. However, the dustproof shutter 30, the torsion spring 46 and the plate springs 471 and 472 also operate in the same way in the case of setting the pendant-type microphone device 2 in the setting portion 20.

FIGS. 10A to 10C are plan views for explaining the operation of the dustproof shutter moving according to the microphone device setting operation. FIG. 10A shows a dustproof shutter closed state, FIG. 10B shows a dustproof shutter intermediate state, and FIG. 10C shows a dustproof shutter open state. In FIGS. 10A to 10C, the internal construction of the microphone charging device 100 is shown in a state where the upper casing 11 is removed. In FIGS. 10A to 10C, plate spring abutment portions 35a and 35b of the dustproof shutter 30 are the same as the plate spring abutment portions 35 shown in FIG. 1. The same applies with respect to FIGS. 12A to 12C referred to below. In FIG. 1, a common reference numeral 35 is used to denote one pair of plate spring abutment portions 35a and 35b.

FIG. 11 is an enlarged view of a portion around the plate spring abutment portion of the dustproof shutter in the dustproof shutter intermediate state, i.e., an enlarged view of portion A in FIG. 10B. FIGS. 12A to 12C are plan views for explaining the operation in which the dustproof shutter is moved, showing the placement relationship between the dustproof shutter and the plate springs. FIG. 12A shows a dustproof shutter closed state, FIG. 12B shows a dustproof shutter intermediate state, and FIG. 12C shows a dustproof shutter open state.

In FIGS. 12A to 12C, the position of the dustproof shutter 30 is specified by the position of the back side end of the dustproof shutter 30. That is, the position of the back side end represents the position of the dustproof shutter 30. FIG. 12A corresponds to the above-described covering position X. In the state shown in FIG. 12A, the dustproof shutter 30 is closed and the charging terminal portion 41 is covered with the dustproof shutter 30. FIG. 12C corresponds to the exposure position Y. In the state shown in FIG. 12C, the dustproof shutter 30 is open and the charging terminal portion 41 is exposed. FIG. 12B shows an additional urging start position Z in the additional urging section at which the dustproof shutter 30 is in abutment on the stepped portions 471d and 472d of the plate springs 471 and 472.

The operation in which the dustproof shutter 30 is moved according to the operation to set the microphone device 1 in the setting portion 20 will be described with reference to FIGS. 7 to 12C. In the dustproof shutter closed state before setting the microphone device 1 in the setting portion 20, the first end portion 462 of the torsion spring 46 abuts on a torsion spring abutment surface 36 of the dustproof shutter 30, as shown in FIG. 7. In this state, the dustproof shutter 30 is urged by the fundamental urging force F1 in the direction from the exposure position Y toward the covering position X. The dustproof shutter 30 is thereby placed in the covering position X to cover the charging terminal portion 41, as shown in FIGS. 7 and 10A. The dustproof shutter 30 in this position can prevent attachment of particles, dust or the like to the charging terminal portion 41. In the state before setting the microphone device 1 in the setting portion 20, the dustproof shutter 30 is not in contact with the plate springs 471 and 472 and the urging force by the plate springs 471 and 472 is not applied to the dustproof shutter 30.

The operation to set the microphone device 1 on the microphone charging device 100 in the above-described dustproof shutter closed state will next be described. The lower end portion of the microphone device 1 is forced in the direction of arrow a in FIG. 7 to set the microphone device 1 in the setting portion 20 through the through hole 3a of the adapter 3. In this microphone device 1 setting operation, the microphone device 1 is pressed against the dustproof shutter 30. The lower end portion of the microphone device 1 presses the slide slanting face 31 of the dustproof shutter 30, and the dustproof shutter 30 moves from the covering position X toward the exposure position Y. The dustproof shutter 30 moves while constantly receiving the fundamental urging force F1 from the torsion spring 46. With the moving operation of the dustproof shutter 30, the lower end portion of the microphone device 1 moves on the slide slanting face 31. The guided groove 33 of the dustproof shutter 30 and the projecting guide rail 113 of the upper casing 11 are fitted to each other to regulate the direction of movement of the dustproof shutter 30. As the dustproof shutter 30 moves toward the exposure position Y, the fundamental urging force F1 increases.

When the dustproof shutter 30 reaches the additional urging start position Z as shown in FIGS. 8, 10B, 11, and 12B, the plate spring abutment portions 35a and 35b of the dustproof shutter 30 are brought into abutment on the stepped portions 471d and 472d of the plate springs 471 and 472. The urging force by the plate springs 471 and 472 is thereby applied to the dustproof shutter 30 in addition to the fundamental urging force F1. The urging force applied in addition to the fundamental urging force F1 is called additional urging force F2, as described above. This urging force F2 is applied in the additional urging section, as described above. The additional urging section starts from the additional urging start position Z. The additional urging start position Z is a position at which the plate spring abutment portions 35a and 35b are brought into abutment on the stepped portions 471d and 472d. The additional urging section ends at the position at which the plate spring abutment portions 35a and 35b surmount the stepped portions 471d and 472d.

Thus, the additional urging force F2 by the plate springs 471 and 472 is applied to the dustproof shutter 30 in addition to the fundamental urging force F1 by the torsion spring 46 in the additional urging section. This state of the dustproof shutter 30 is called the additionally urged state, as described above. In the additionally urged state, the urging force to the dustproof shutter 30 is F1+F2, thus increased. As the setting force applied to the microphone device 1 to set the microphone device 1 in the setting portion 20, a force counteracting the urging force F1+F2 is required. Therefore, the microphone setting force is also increased.

At the point in time at which the dustproof shutter 30 reaches the additional urging start position Z, the microphone device 1 is not completely set in the setting portion 20 and the electricity receiving terminal of the microphone device 1 is not connected to the charging terminal portion 41.

The operation corresponding to transition from the above-described dustproof shutter intermediate state to the dustproof shutter open state will next be described. Forcing in the lower end portion of the microphone device 1 in the direction of arrow α is further performed continuously. The lower end portion of the microphone device 1 is thereby caused to slide further on the slide slanting face 31 of the dustproof shutter 30. The dustproof shutter 30 is in the additionally urged state of receiving together the fundamental urging force F1 by the torsion spring 46 and the additional urging force F2 by the plate springs 471 and 472. In this additionally urged state, the dustproof shutter 30 is moved in the direction from the covering position X toward the exposure position Y.

When, with further forcing-in of the lower end portion of the microphone device 1 in the direction of arrow α, the plate spring abutment portions 35a and 35b of the dustproof shutter 30 surmount the stepped portions 471d and 472d of the plate springs 471 and 472, the additional urging section ends. The dustproof shutter 30 is released from the additionally urged state by the additional urging force F2. Immediately after release from the additionally urged state, the setting force as strong as that before the release is still applied to the microphone device 1. The lower end portion of the microphone device 1 is thereby caused to slide further on the slide slanting face 31 of the dustproof shutter 30 to move the dustproof shutter 30 to the exposure position Y. The lower end portion of the microphone device 1 comes off from the slide slanting face 31 at the front side of the dustproof shutter 30 and moves toward the charging terminal portion 41. The force to set the microphone device 1 in the direction of arrow α is large to cause a large acceleration of the microphone device 1, so that the microphone device 1 moves at a high speed in the direction of arrow α with force. As shown in FIGS. 9, 10C, and 12C, the microphone device 1 is then set in the setting portion 20 and the electricity receiving terminal of the microphone device 1 is forcibly connected to the charging terminal portion 41. The end of the additional urging section is set between a position close to and before the exposure position Y and the exposure position Y.

The plate springs 471 and 472 are provided so that the setting force for setting the microphone device 1 in the setting portion 20 against the additional urging force F2 is larger than the terminal connection load for connecting the electricity receiving terminal of the microphone device 1 to the charging terminal portion 41. The setting force is thereby increased relative to the terminal connection load with reliability. As a result, the electricity receiving terminal of the microphone device 1 can be connected to the charging terminal portion 41 with reliability.

When the microphone device 1 is drawn off from the setting portion 20 in a direction opposite to the direction of arrow α, the dustproof shutter 30 is moved to the covering position X by the fundamental urging force F1 of the torsion spring 46. Thus, the dustproof shutter 30 can be moved to the covering position X with the microphone device 1 drawing off operation to cover the charging terminal portion 41.

As described above, according to the present invention, the torsion spring 46 for urging the dustproof shutter 30 is provided to enable the dustproof shutter 30 to be moved between the covering position X and the exposure position Y with the operation to set the microphone device 1 in the setting portion 20 or drawing off the microphone device 1 from the setting portion 20. By being linked to the operation to set or draw off the microphone device 1, the dustproof shutter 30 can be moved to cover or expose the charging terminal portion 41. Thus, the operational convenience is improved.

The torsion spring 46 applies the fundamental urging force F1 to the dustproof shutter 30 between the covering position X and the exposure position Y in the direction from the exposure position Y to the covering position X, and the plate springs 471 and 472 further urge the dustproof shutter 30 in the direction from the exposure position Y toward the covering position X in the additional urging section provided between the covering position X and the exposure position Y. The additional urging force F2 is thereby applied to the dustproof shutter 30 in addition to the fundamental urging force F1 to attain the additionally urged state. When the dustproof shutter 30 reaches the end of the additional urging section, the dustproof shutter 30 is released from the additionally urged state. Immediately before the release, the setting force for setting the microphone device 1 on the microphone charging device 100 is increased against the urging force of the plate springs 471 and 472. By the strong setting force immediately before the release, the charging terminal portion 41 and the electricity receiving terminal of the microphone device 1 are forcibly connected to each other. The force at the time of connection of the electricity receiving terminal of the microphone device 1 to the charging terminal portion 41 can be increased in this way. The occurrence of connection failure between the electricity receiving terminal of the microphone device 1 and the charging terminal portion 41 can therefore be reduced without requiring a complicated arrangement such as a fitting structure. As a result, the operational convenience is improved and the occurrence of connection failure between the electricity receiving terminal of the microphone device 1 and the charging terminal portion 41 can be reduced without requiring a complicated arrangement such as a fitting structure.

In the present embodiment, the plate spring abutment portions 35a and 35b of the dustproof shutter 30 are brought into abutment on the stepped portions 471d and 472d of the plate springs 471 and 472. The additional urging section is a section from the position at which the plate spring abutment portions 35a and 35b are brought into abutment on the stepped portions 471d and 472d with the movement of the dustproof shutter 30 from the covering position X, to the position at which the plate spring abutment portions 35a and 35b surmount the stepped portions 471d and 472d. With this arrangement, application of the suitable additional urging force F2 to the dustproof shutter 30 in the additional urging section can be achieved by means of the simple arrangement in which plate springs 471 and 472 having stepped portions 471d and 472d are provided. As a result, the occurrence of connection failure between the charging terminal portion 41 and the electricity receiving terminal of the microphone device 1 can be reduced without requiring a complicated arrangement such as a fitting structure.

In the present embodiment, the plate springs 471 and 472 are provided so that when the dustproof shutter 30 reaches the exposure position Y by moving from the covering position X, the setting force for setting the microphone device 1 in the setting portion 20 against the additional urging force F2 is larger than the terminal connection load for connecting the electricity receiving terminal of the microphone device 1 to the charging terminal portion 41.

The setting force at the time of setting the microphone device 1 in the setting portion 20 is thereby increased relative to the terminal connection load for connecting the electricity receiving terminal of the microphone device 1 in the charging terminal portion 41 with reliability, so that the electricity receiving terminal of the microphone device 1 can be connected to the charging terminal portion 41 with reliability. As a result, the occurrence of connection failure between the electricity receiving terminal of the microphone device 1 and the charging terminal portion 41 can be reduced.

While the electric appliance is a microphone device in the above-described embodiment, the electric appliance may be any of other electric appliances, e.g., a portable telephone or electronic pocket notebook if the electric appliance has a connection-target terminal to be connected to the connection terminal of the electric appliance connection device. While the electric appliance connection device is a microphone charging device in the above-described embodiment, the electric appliance connection device may be any other device if the device has a connection terminal to be connected to a connection-target terminal of an electric appliance. Therefore, the electric appliance connection device is not limited to charging devices for charging electric appliances.

While there has been described what is at present considered to be a preferred embodiment of the invention, it will be understood that various modifications and variations may be made thereto, and it is intended that appended claims cover all such modifications and variations as fall within the true spirit and scope of the invention.

INDUSTRIAL APPLICABILITY

As described above, the present invention has the advantage of improving the operational convenience and reducing the occurrence of connection failure between a connection-target terminal of an electric appliance and a connection terminal without requiring a complicated arrangement such as a fitting structure. The present invention is useful in application to, for example, a charging device for charging an electric appliance such as a microphone device, a portable telephone or an electronic pocket notebook.

The invention claimed is:

1. An electric appliance connection device having a dust-proofing function, comprising:
   a casing having a setting portion in which an electric appliance having a connection-target terminal is set;
   a connection terminal connected to the connection-target terminal when the electric appliance is set in the setting portion;
   a covering member provided to cover the connection terminal, and capable of moving between a covering position and an exposure position with an operation to set the electric appliance in the setting portion and with an operation to draw off the electric appliance from the setting portion, the covering member covering the connection terminal at the covering position, the covering member exposing the connection terminal at the exposure position;
   a first urging member which applies a fundamental urging force to the covering member between the covering position and the exposure position in a direction from the exposure position toward the covering position; and
   a second urging member which applies an additional urging force to the covering member in addition to the fundamental urging force by urging the covering member in an additional urging section provided between the covering position and the exposure position in a direction from the exposure position toward the covering position, and thereby sets the covering member in an additionally urged state, the second urging member releasing the covering member from the additionally urged state in which the covering member is urged by the second urging member when the covering member reaches the end of the additional urging section;
   wherein the covering member has an abutment portion which is brought into abutment on the second urging member; the second urging member is constituted by a plate spring held on the casing, the plate spring extending from the covering position toward the exposure position and having a stepped portion bent toward the covering member; and the additional urging section is a section from a position at which the abutment portion is brought into abutment on the stepped portion with the movement of the covering member from the covering position, to a position at which the abutment portion surmounts the stepped portion.

2. The electric appliance connection device having a dust-proofing function according to claim 1, wherein the second urging member is provided so that when the covering member reaches the end of the additional urging section by moving from the covering position, a setting force for setting the electric appliance in the setting portion against the additional urging force is larger than a terminal connection load for connecting the connection-target terminal to the connection terminal.

* * * * *